United States Patent Office 3,318,714
Patented May 9, 1967

3,318,714
PIGMENT DISPERSIONS
Charles H. Coney and Willie E. Draper, Kingsport, Tenn., assignors to Eastman Kodak Company, Rochester, N.Y., a corporation of New Jersey
No Drawing. Filed Oct. 23, 1965, Ser. No. 504,082
12 Claims. (Cl. 106—193)

This application is a continuation-in-part of our copending application, Ser. No. 300,087, filed Aug. 5, 1963.

The invention relates to dispersions of pigment, and to compositions containing those dispersions.

Pigments have previously been dispersed in various media, but the dispersions of the prior art have been unsatisfactory in that they could only be incorporated in a very limited number of plastics or other compositions. The reason for this disadvantage is that the media previously used to disperse pigments have been incompatible with many compositions in which the pigments could be incorporated, or the media have been detrimental to the properties of the compositions. In some instances, such as with water base coating compositions, it has been most difficult to provide satisfactory pigment dispersions. It therefore appears desirable to provide dispersions of pigment which can be incorporated in a wide variety of compositions with good compatibility and without interfering with the properties of the compositions.

One object of our invention is to provide novel dispersions of pigments. Another object of our invention is to provide dispersions of pigment which may be incorporated in a wide variety of compositions with good compatibility and without detrimental effects on the properties of the compositions. A further object of our invention is to provide plastic compositions containing novel dispersions of pigments. A still further object of our invention is to provide water base coating compositions containing novel pigment dispersions. Other objects of our invention will appear herein.

We have found that pigments may be easily dispersed in sucrose acetate isobutyrate (referred to hereinafter as SAIB), and that these pigment dispersions may be incorporated in a wide variety of compositions, including synthetic plastic compositions and water base coating compositions, with good compatibility and without interfering with the properties of the compositions. Our invention will be further illustrated by the following examples. Example 1 shows the incorporation of a variety of pigments in SAIB.

Example 1

Dispersions of pigment in SAIB were prepared using a 3-roll mill, the rolls of which were heated to 200° F. The SAIB pigment dispersions were passed twice through the 3-roll mill. The following table lists a number of pigments which were incorporated in SAIB, the concentration of pigment based on the weight of the SAIB, and the Hegman Scale grind fineness values.

TABLE I

| Pigment Type | Percent Pigment | Hegman Scale Grind Fineness |
|---|---|---|
| Rutile titanium dioxide (white) | 70 | >8 |
| Anatase titanium dioxide (white) | 60 | 8 |
| Lead chromate-sulfate-phosphate (chromic yellow) | 70 | >8 |
| Chromium oxide (green) | 70 | >8 |
| Basic lead chromate-oxide (orange) | 70 | >8 |
| Cadmium sulfide-barium sulfate (cadmium red) | 50 | >8 |
| Cadmium-zinc sulfide-barium sulfate (yellow) | 70 | >8 |
| Lead chromate-iron blue (green) | 70 | >8 |
| Phthalocyanine (green) | 40 | 7 |
| Phthalocyanine (blue) | 38, 30, 19 | 5, 7, 8 |
| Toluidine (yellow) | 40, 30 | 6. 5, 8 |
| Toluidine (red) | 30 | 7. 7 |
| BON (red) | 30 | 7. 5 |
| Iron ferrocyanide (blue) | 25 | 7. 8 |
| Burnt umber (brown) | 50 | 7. 6 |
| Burnt sienna (red-brown) | 50 | 6. 5 |
| Carbon (black) | 10 | >8 |
| Nickel-azo complex (yellow-green) | 50 | 7. 5 |

The following examples illustrate the wide variety of compositions which may be pigmented with the SAIB-pigment dispersions of the invention. In these examples, all percentages refer to parts by weight unless otherwise noted, and the gloss meter readings are obtained on a standard Gardner glossmeter using 60° meter readings. The results are given in percent reflectance. The pigments were dispersed in SAIB in the manner described in Example 1.

Example 2

A cellulose acetate butyrate-acrylic lacquer containing 10.5 parts cellulose acetate butyrate (37% butyryl, 13% acetyl, and a viscosity of 0.4 second as determined by the ASTM falling ball method), 10.5 parts acrylic resin (60–40 copolymer methyl methacrylate and butyl methacrylate), 1.7 parts silicone resin and 25.8 parts solvent were pigmented with various pigments dispersed in SAIB, and coated on a metallic substrate with the following results:

TABLE II

| Pigment Dispersion 70% Pigment, 30% SAIB | Pigment Concentration | Gloss Reflectance (percent) |
|---|---|---|
| Titanium dioxide | 20 | 87 |
|  | 32 | 79 |
| Chrome yellow | 20 | 87 |
|  | 32 | 81 |
| Carbon black | 1.2 | 82 |
|  | 2.3 | 74 |
| Cadmium red | 17.2 | 76 |

Example 3

A curing type enamel coating containing 17.9 parts epoxy resin (condensation polymer of bis-phenol and epichlorohydrin having an epoxide equivalent of 500), 10.8 parts urea-formaldehyde resin, and 17 parts solvent were pigmented with various pigments dispersed in SAIB and coated on a substrate with the following results:

TABLE III

| Pigment Dispersion 70% Pigment, 30% SAIB | Pigment Concentration | Gloss Reflectance (percent) |
|---|---|---|
| Titanium dioxide | 20 | 82 |
|  | 30 | 70 |
| Chrome yellow | 20 | 92 |
|  | 30 | 75 |
| Carbon black | 1.2 | 95 |
|  | 2.2 | 94 |
| Cadmium red | 9.5 | 94 |
|  | 16.7 | 90 |

*Example 4*

A melamine-alkyd curing type enamel consisting of 46.3 parts melamine-formaldehyde resin, 47.2 parts alkyd resin and 20 parts solvent were pigmented with pigment dispersions in accordance with the invention and coated on a substrate with the following results:

TABLE IV

| Pigment Dispersion 70% Pigment, 30% SAIB | Pigment Concentration | Gloss Reflectance (percent) |
|---|---|---|
| Titanium dioxide | 20.5 | 100 |
|  | 46.7 | 100 |
| Chrome yellow | 20.5 | 100 |
|  | 46.7 | 99 |
| Carbon black | 1.1 | 100 |
|  | 2.2 | 98 |
| Cadmium red | 9.1 | 99 |
|  | 16.9 | 95 |

*Example 5*

A baking-type acrylic enamel containing 19.1 parts methyl methacrylate-ethyl methacrylate copolymer and 30 parts solvent were pigmented with the following pigment dispersions, coated and cured with the following results:

TABLE V

| Pigment Dispersion 70% Pigment, 30% SAIB | Pigment Concentration | Gloss Reflectance (percent) |
|---|---|---|
| Titanium dioxide | 19.1 | 88 |
|  | 30.5 | 85 |
| Chrome yellow | 19.1 | 86 |
|  | 30.5 | 85 |
| Carbon black | 1.1 | 88 |
|  | 2.2 | 86 |
| Cadmium red | 9.2 | 88 |
|  | 16.8 | 87 |

*Example 6*

A coating composition composed of 67 parts ethyl cellulose, 33 parts dewaxed dammar resin and compatible solvent were pigmented with various SAIB pigment dispersions and coated on a metallic substrate with the following results:

TABLE VI

| Pigment Dispersion 70% Pigment, 30% SAIB | Pigment Concentration | Gloss Reflectance (percent) |
|---|---|---|
| Titanium dioxide | 19 | 81 |
|  | 32 | 75 |
| Chrome yellow | 19 | 85 |
|  | 32 | 87 |
| Carbon black | 1.2 | 83 |
|  | 2.4 | 85 |
| Cadmium red | 9.2 | 83 |
|  | 16.8 | 85 |

*Example 7*

A coating composition comprising, in a compatible solvent, a polyvinyl chloride-polyvinyl acetate copolymer (91% vinyl chloride and 9% vinyl acetate) together with another polyvinyl chloride-polyvinyl acetate copolymer (87% vinyl chloride and 13% vinyl acetate) was pigmented with various SAIB pigment dispersions with the following results:

TABLE VII

| Pigment Dispersion 70% Pigment, 30% SAIB | Pigment Concentration | Gloss Reflectance (percent) |
|---|---|---|
| Titanium dioxide | 18.9 | 91 |
|  | 32 | 91 |
| Chrome yellow | 18.9 | 92 |
|  | 32 | 92 |
| Carbon black | 1.1 | 93 |
|  | 2.2 | 90 |
| Cadmium red | 9.1 | 92 |
|  | 16.8 | 91 |

The utility of SAIB pigment dispersions and water base coating compositions are demonstrated in the following example.

*Example 8*

A polyvinyl acetate paint was made as follows:

Pigment Paste (Part I): Parts by wt.
Rutile titanium dioxide _____ 191.9
Mica (325 mesh) _____ 28.8
Plasticizer _____ 28.8
2,2,4-trimethylpentane-3,5-diol _____ 33.6
Polyoxethylated vegetable oil _____ 2.9
Sodium salt of carboxylated polyelectrolyte _ 4.8
Polypropylene glycol _____ 1.9
Water _____ 62.4

Reduction (Part II): Parts by wt.
Methyl cellulose (2% aq., 4000 cps.) _____ 191.9
Polyvinyl acetate emulsion (55% non-volatile) _____ 345.5
Sodium salt of pentachlorophenol _____ 14.4
Water _____ 93.1

Total _____ 1000.0

Part I was mixed and then pebble milled for 48 hours and Part II was added to Part I and again milled for an additional 2 hours. 100 parts of this white paint formulation was modified with 18 and 30 parts of various SAIB pigment dispersions (30% SAIB and 70% pigment). The pigments employed in the SAIB pigment dispersions were chrome yellow, cadmium red, and phthalocyanine blue. The pigmentations at both concentrations produced excellent tint, viscosity and good emulsion stability.

The sucrose acetate isobutyrate which we employ in our invention is described in Touey et al. U.S. Patent 2,931,802. SAIB has been found to be an excellent dispersing agent for pigments. The pigments may be dispersed in SAIB in any suitable manner, for example, with pebble mills, sand mills, 3-roll mills or 5-roll mills or any other suitable manner.

As indicated in the foregoing examples, dispersions of pigment in SAIB may be incorporated in a wide variety of plastics including cellulose esters such as the lower fatty esters of cellulose, e.g., cellulose acetate and cellulose butyrate; cellulose nitrate; cellulose ethers such as ethyl cellulose; vinyl polymers and copolymers such as polyvinyl chloride-polyvinyl acetate copolymers; alkyd resins, urea-formaldehyde resins; melamine formaldehyde resins; acrylic resins such as methyl acrylate-ethyl acrylate copolymers; natural resins such as dammar resins; and many other compositions.

As noted heretofore, the dispersions of pigments in SAIB in accordance with our invention are particularly advantageous in view of the large number of compositions in which they may be incorporated whereas pigment dispersions of the prior art have been limited in the number of compositions in which they could be usefully incorporated.

The invention has been described in detail with particular reference to preferred embodiments thereof but it will be understood that variations and modifications can be effected within the spirit and scope of the invention as described hereinabove and as defined in the appended claims.

We claim:
1. A process for preparation of coating compositions and coated substrates which comprises:
   (1) milling into sucrose acetate isobutyrate up to about 75% by weight of a pigment selected from the group consisting of rutile titanium dioxide, anatase titanium dioxide, lead chromate-sulfate-phosphate, chromium oxide, basic lead chromate-oxide, cadmium sulfide-barium sulfate, cadmium-zinc sulfide-barium sulfate, lead chromate-iron blue, phthalocyanine green, phthalocyanine blue, toluidine, a BON monoazo coupling of a diazotized aromatic amine red, iron ferrocyanide, burnt umber, burnt sienna, carbon black, and yellow-green nickel-azo complex,
   (2) incorporating the resulting dispersion in a synthetic resin or water-base coating with which it has good compatibility without interfering with the inherent properties of said coating, said coating being selected from the group consisting of cellulose esters, cellulose ethers, vinyl polymers and copolymers, alkyd resins, urea-formaldehyde resins, melamine formaldehyde resins, acrylic resins, natural resins,
   (3) applying said coating to a substrate and
   (4) curing same thereon.

2. A process for preparation of coating compositions and coated substrates which comprises pigmenting a cellulose acetate butyrate-acrylic lacquer with a dispersion of up to about 75% by weight of a pigment selected from the group consisting of titanium dioxide, chrome yellow, carbon black and cadmium red dispersed in sucrose acetate isobutyrate, the resulting lacquer containing a pigment concentration from about 1 to about 20% by weight and having a gloss or reflectance of about 75–90%, and coating said lacquer on a metallic substrate.

3. A process for preparation of coating compositions and coated substrates which comprises pigmenting a curing type enamel made up of a condensation polymer of bis-phenol and epichlorohydrin and urea-formaldehyde resin with a dispersion in sucrose acetate isobutyrate of up to about 75% by weight of a pigment selected from the group consisting of titanium dioxide, chrome yellow, carbon black, and cadmium red and coating said enamel on a substrate at a pigment concentration of about 1–30% by weight to give a gloss or reflectance of about 70–95%.

4. A process for preparation of coating compositions and coated substrates which comprises pigmenting a melamine-alkyd curing enamel made up of a melamine-formaldehyde resin and an alkyd resin with a dispersion in sucrose acetate isobutyrate of about 75% by weight of a pigment selected from the group consisting of titanium dioxide, chrome yellow, carbon black, and cadmium red and coating said enamel on a substrate at a pigment concentration of about 1–47% by weight to give a gloss or reflectance of about 95–100%.

5. A process for preparation of coating compositions and coated substrates which comprises pigmenting a baking-type acrylic enamel made up of a methyl methacrylate-ethyl methacrylate copolymer with a dispersion in sucrose acetate isobutyrate of up to about 75% by weight of a pigment selected from the group consisting of titanium dioxide, chrome yellow, carbon black, and cadmium red, coating said enamel on a substrate at a pigment concentration of about 1–31% by weight and curing the enamel-coated substrate to give a gloss or reflectance of about 85–88%.

6. A process for preparation of coating compositions and coated substrates which comprises pigmenting a coating composition made up of ethyl cellulose and dewaxed dammar resin with a dispersion in sucrose acetate isobutyrate of up to about 75% by weight of a pigment selected from the group consisting of titanium dioxide, chrome yellow, carbon black, and cadmium red and applying said composition to a metallic substrate at a pigment concentration of about 1–32% by weight to give a gloss or reflectance of about 75–85%.

7. A process for preparation of coating compositions and coated substrates which comprises pigmenting a polyvinyl chloride-polyvinyl acetate copolymer with a dispersion in sucrose acetate isobutyrate of up to about 75% by weight of a pigment selected from the group consisting of titanium dioxide, chrome yellow, carbon black, and cadmium red and applying said composition to a substrate at a pigment concentraton of about 1–32% by weight to give a gloss or reflectance of about 90–93%.

8. A process for preparation of a polyvinyl acetate paint which comprises in respective order:
   (1) mixing by milling a pigment paste made up of a major part of rutile titanium dioxide and a minor part of mica, plasticizer, 2,2,4-trimethylpentane-3,5-diol, polyoxethylated vegetable oil, sodium salt of carboxylated polyelectrolyte, polypropylene glycol and water,
   (2) adding to said pigment paste a reduction composition comprising a major amount of polyvinyl acetate emulsion and a minor amount of methyl cellulose, the sodium salt of pentachlorophenol and water,
   (3) milling the resulting paint and
   (4) modifying about 100 parts of said paint with about 18–30 parts of a dispersion in sucrose acetate isobutyrate of about 70% of a pigment selected from the group consisting of chrome yellow, cadmium red, and phthalocyanine blue to produce a pigmented paint of excellent tint, viscosity and good emulsion stability.

9. A method of formulating a colored coating and finishing system comprising the steps of:
   (1) preparing a pigment dispersion by dispersing 10–70% based on the weight of the total dispersion of a pigmenting material in sucrose acetate isobutyrate, and
   (2) incorporating the prepared pigment dispersion into a coating and finishing material which is selected from the group consisting of a lower fatty acid ester of cellulose, cellulose nitrate, cellulose ether, vinyl polymers and copolymers, alkyd resins, urea-formaldehyde resins, melamine formaldehyde resins, acrylic resins, and natural resins.

10. A process for preparation of coating compositions, the process comprising dispersing up to about 75% by weight pigment into sucrose acetate isobutyrate to form a pigment dispersion that is compatible with synthetic resins or water base coatings and which may be added thereto without materially interfering with the inherent properties of the coatings, and incorporating the resulting pigment dispersion in a synthetic resin coating or water base coating.

11. Process of claim 10 in which the pigment is milled into the sucrose acetate isobutyrate at an elevated temperature.

12. Process of claim 11 in which the milling is roll milling accomplished at about 200° F.

References Cited by the Examiner
UNITED STATES PATENTS

| | | | |
|---|---|---|---|
| 1,953,956 | 4/1934 | Dreyfus | 106—198 XR |
| 2,389,940 | 11/1945 | Speicher | 106—198 |
| 2,714,076 | 7/1955 | Seckel | 106—198 XR |
| 2,931,802 | 4/1960 | Touey et al. | 260—234 |
| 3,001,883 | 9/1961 | Vivian et al. | 106—191 XR |
| 3,076,718 | 2/1963 | Gearhart et al. | 106—195 |
| 3,158,493 | 11/1964 | Long et al. | 106—162 |
| 3,215,137 | 11/1965 | Laakso et al. | 260—31.8 XR |
| 3,216,840 | 11/1965 | Rouse et al. | 106—195 XR |

OTHER REFERENCES

SAIB, Eastman Chemical Products, Inc., Bulletin No. N-105 15 pp., page 7, 1959.

ALEXANDER H. BRODMERKEL, *Primary Examiner.*

J. H. WOO, *Assistant Examiner.*